(12) United States Patent
Amrania et al.

(10) Patent No.: US 11,334,038 B2
(45) Date of Patent: May 17, 2022

(54) AUTOMATION SYSTEM

(71) Applicant: LightFi Limited, London (GB)

(72) Inventors: Hemmel Amrania, London (GB); Alexey Olegovich Bak, London (GB); Matthew William Taylor, London (GB)

(73) Assignee: LightFi Limited, London (GB)

( * ) Notice: Subject to any disclaimer, the term of this patent is extended or adjusted under 35 U.S.C. 154(b) by 5 days.

(21) Appl. No.: 16/333,301

(22) PCT Filed: Sep. 13, 2017

(86) PCT No.: PCT/GB2017/052702
§ 371 (c)(1),
(2) Date: Mar. 14, 2019

(87) PCT Pub. No.: WO2018/051088
PCT Pub. Date: Mar. 22, 2018

(65) Prior Publication Data
US 2020/0183343 A1 Jun. 11, 2020

(30) Foreign Application Priority Data
Sep. 14, 2016 (GB) ...................... 1615636

(51) Int. Cl.
G05B 15/02 (2006.01)
H04W 4/33 (2018.01)
H05B 47/14 (2020.01)
(52) U.S. Cl.
CPC .............. G05B 15/02 (2013.01); H04W 4/33 (2018.02); H05B 47/14 (2020.01); G05B 2219/2642 (2013.01)

(58) Field of Classification Search
None
See application file for complete search history.

(56) References Cited

U.S. PATENT DOCUMENTS 9,551,504 B2 * 1/2017 Arensmeier .............. F24D 5/04
9,612,589 B1 4/2017 Dawson-Haggerty et al.
(Continued)

FOREIGN PATENT DOCUMENTS

| CN | 105869238 A | 8/2016 |
|---|---|---|
| GB | 2553798 A | 3/2018 |
| WO | WO2012/015404 | 2/2012 |

OTHER PUBLICATIONS

GB Combined Search and Examination Report for GB1615636.6 dated Feb. 17, 2017.
(Continued)

Primary Examiner — Srinivas Sathiraju
(74) Attorney, Agent, or Firm — Occhiuti & Rohlicek LLP

(57) ABSTRACT

A building system controller for controlling an environment in a region of a building. The controller is coupled to a building system and operable to change a state of the building system. The controller comprises a processor and a receiver coupled to the processor, the receiver being operable to incidentally observe a wireless signal from an electronic device in the region of the building. The processor is configured to determine whether the observed signal satisfies a predetermined control criterion, and the controller is configured to change a state of the building system in dependence on the determination that the control criterion is satisfied.

20 Claims, 3 Drawing Sheets

(56) References Cited

U.S. PATENT DOCUMENTS

| | | | |
|---|---|---|---|
| 10,168,193 B2* | 1/2019 | Jost | G01D 21/00 |
| 2002/0194387 A1 | 12/2002 | Defosse | |
| 2003/0102979 A1 | 6/2003 | Jednacz et al. | |
| 2006/0202815 A1* | 9/2006 | John | G08B 21/14 |
| | | | 340/531 |
| 2008/0133052 A1* | 6/2008 | Jones | G05D 1/0088 |
| | | | 700/245 |
| 2008/0242314 A1 | 10/2008 | McFarland | |
| 2010/0145479 A1 | 6/2010 | Griffiths | |
| 2013/0157559 A1 | 6/2013 | Flammer, III et al. | |
| 2014/0031989 A1 | 1/2014 | Bergman et al. | |
| 2014/0107846 A1* | 4/2014 | Li | F24F 11/30 |
| | | | 700/275 |
| 2014/0207282 A1 | 7/2014 | Angle et al. | |
| 2014/0347182 A1 | 11/2014 | Poursohi et al. | |
| 2015/0088272 A1 | 3/2015 | Drew | |
| 2015/0097958 A1 | 4/2015 | Fadell et al. | |
| 2015/0148965 A1* | 5/2015 | Lemire | F24F 11/62 |
| | | | 700/276 |
| 2015/0268205 A1 | 9/2015 | Gettings et al. | |
| 2015/0276238 A1 | 10/2015 | Matsuoka et al. | |
| 2016/0056629 A1* | 2/2016 | Baker | H05B 47/115 |
| | | | 700/276 |
| 2016/0127875 A1* | 5/2016 | Zampini, II | G01S 5/00 |
| | | | 370/311 |
| 2017/0038787 A1 | 2/2017 | Baker et al. | |
| 2017/0089602 A1* | 3/2017 | Lemire | H04W 4/20 |
| 2017/0308072 A1* | 10/2017 | Arensmeier | G05B 23/0224 |
| 2018/0004178 A1 | 1/2018 | Haines et al. | |
| 2018/0027386 A1* | 1/2018 | Zampini, II | H04W 52/0296 |
| | | | 370/311 |
| 2018/0087795 A1 | 3/2018 | Okita et al. | |
| 2018/0292520 A1* | 10/2018 | Bermudez | G08B 25/08 |
| 2018/0299154 A1* | 10/2018 | Lemire | G05B 15/02 |
| 2019/0212722 A1* | 7/2019 | Arensmeier | F24F 11/30 |
| 2020/0183343 A1* | 6/2020 | Amrania | H05B 47/14 |

OTHER PUBLICATIONS

International Search Report dated Mar. 23, 2020 in PCT Application No. PCT/GB2020/050157.
Examination Report dated Apr. 2, 2020 in GB Application No. 1901292.1.
First Examination Report dated Jun. 30, 2021 in IN Application No. 201927010946.
First Chinese Office Action dated Sep. 13, 2021 in CN Application No. 201780065636.6.

* cited by examiner

US 11,334,038 B2

AUTOMATION SYSTEM

CROSS-REFERENCE TO RELATED APPLICATIONS

The application claims the benefit of, and priority to, International Application No. PCT/GB2017/052702, entitled "Automation System," and filed Sep. 13, 2017, which claims the benefit of, and priority to, UK application No. GB1615636.6, filed Sep. 14, 2016, the contents of all of which are incorporated herein by reference in their entireties.

The present invention relates to an automation system, in particular to a building system controller for controlling an environment in a region of a building.

BACKGROUND

Increasingly, people are becoming conscious of energy usage in office environments. Lighting left on unnecessarily wastes energy, which leads to wasted costs. It has been estimated that up to one third of people leave lights on unnecessarily when leaving a room. In the EU alone, lighting left on unnecessarily overnight in offices is believed to generate a €1 billion annual cost.

Attempts have been made to address this, by using timing systems and motion sensors. Timing systems can be used to turn office lighting on at a given time in the morning, and to turn office lighting off at a given time in the evening. This system is not able to deal with people arriving early or staying late and so provides imprecise control. In these situations, users need to revert to manual control of the lighting. If manual control is not disengaged, lighting can still be left on unnecessarily.

Motion sensors, such as passive infra-red motion sensors, are able to react to the motion of people entering offices, and turn lights on accordingly. However, these systems typically require a large number of sensors to be installed in an office to be able to sense movement throughout the office. Also, when people remain still, for example when working at a desk, motion sensor systems often turn lights off at inconvenient times.

There is therefore a need to address drawbacks associated with current automated systems.

SUMMARY

According to an aspect of the present invention, there is provided a building system controller for controlling an environment in a region of a building, the controller being coupled to a building system and operable to change a state of the building system, the controller comprising:
  a processor; and
  a receiver coupled to the processor, the receiver being operable to incidentally observe a wireless signal from an electronic device in the region of the building;
  the processor being configured to determine whether the observed signal satisfies a predetermined control criterion; and
  the controller being configured to change a state of the building system in dependence on the determination that the control criterion is satisfied.

Suitably the controller is configured to determine a characteristic of the observed signal, and the control criterion is a predetermined level of similarity between the observed characteristic and a stored characteristic. Suitably the controller is configured to store the observed characteristic.

Suitably the wireless signal is a packet-based wireless signal.

Suitably the characteristic of the observed signal comprises at least one of: a destination address of the signal; a source address of the signal; a received signal strength; a network name of a network on which the signal is observed; a time at which the signal is observed; a number of observed packets; and a rate of observed packets.

Suitably the observed signal comprises header information, and the processor is configured to determine whether the observed signal satisfies the predetermined control criterion in dependence on the header information.

Suitably the controller is configured to observe the wireless signal periodically.

Suitably the controller is configured to scan for wireless signals from electronic devices in the region of the building prior to incidentally observing the wireless signal, and to store information associated with wireless signals detected in the scan.

Suitably the controller is configured to receive information associated with wireless signals, and to store the information, in which the controller is configured to receive the information from one or more of a computing device connectable to the controller and a user interface.

Suitably the information comprises at least one of: a wireless protocol of the wireless signal; a frequency or frequency band of the wireless signal; an activity level of the wireless signal; a signal strength of the wireless signal; a network name of a wireless network; an address of an access point of a wireless network; and an address of the electronic device.

Suitably the controller is configured to determine a signal channel to incidentally observe in dependence on the information.

Suitably the processor is configured to output a control signal to the building system to cause the change in the state of the building system.

Suitably the controller comprises a transmitter operable to transmit a wireless control signal, and the controller is configured to change the state of the building system by causing the transmitter to transmit the wireless control signal.

According to another aspect of the present invention, there is provided a method for controlling an environment in a region of a building, the building comprising a building system, the method comprising:
  incidentally observing a wireless signal from an electronic device in the region of the building;
  determining whether the observed signal satisfies a predetermined control criterion; and
  changing a state of the building system in dependence on the determination that the control criterion is satisfied.

According to another aspect of the present invention, there is provided computer readable code configured to perform the steps of the method as described above when the code is run on a computer.

Any one or more feature of any aspect above may be combined with any one or more feature of that aspect and/or any other aspect above. Any apparatus feature may be written as a method feature where possible, and vice versa. These have not been written out in full here merely for the sake of brevity.

This Summary is provided to introduce a selection of concepts in a simplified form that are further described below in the Detailed Description. The mention of features in this Summary does not indicate that they are key features or essential features of the invention or of the claimed subject matter, nor is it to be taken as limiting the scope of the claimed subject matter.

BRIEF DESCRIPTION OF THE FIGURES

The present invention will now be described by way of example with reference to the accompanying drawings. In the drawings.

DETAILED DESCRIPTION

Figure 1:
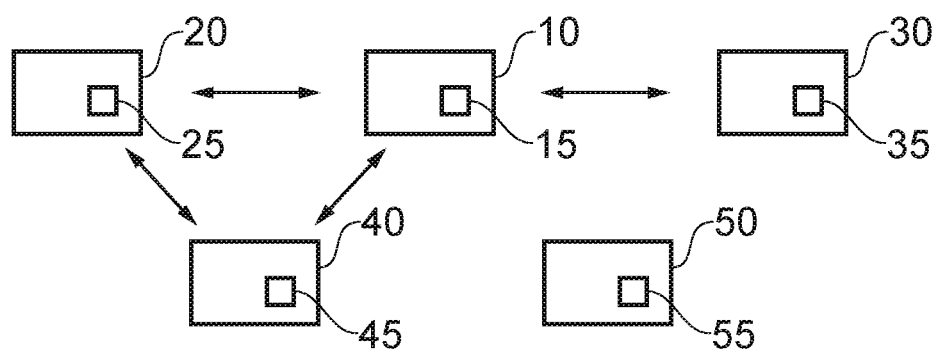
FIG. 1 schematically illustrates an arrangement of electronic devices including a controller.

A building system interacts with devices associated with a building. Such building devices suitably include many different types of device, for example a light fitting, a heating system or a controller for the heating system, and an air conditioning unit or a controller for the air conditioning unit. The building device can comprise a HVAC (heating, ventilating, air conditioning) device. In general, the building device can comprise any powered device or system. A building device is conveniently a device forming part of the building's infrastructure. A building device may, for example, provide any one or more of lighting, heating, cooling, ventilation and access (as in the case of a door lock or lift/elevator controller).

The building devices have several states. In a simple case, a building device can have an ON state and an OFF state. In other cases, there may be other possible states. For example, a light fitting suitably has one or more dimmed state in addition to its ON and OFF states. A heating system, or a controller for the heating system, suitably has additional states corresponding to different temperature settings, for example a daytime setting of, say, 20 degrees Celsius, and a night-time setting of, say, 14 degrees Celsius. Similarly, an air conditioning unit, or a controller for the air conditioning unit, suitably has additional states corresponding to different temperature settings. The various states of the building devices suitably correspond to differing power levels or power states of the building devices. As a result, switching from a state with a higher power level to a state with a lower power level, such as dimming a light or turning down a heating system, can save energy.

The building system has a state which suitably depends on the state of at least one building device. For example, the state of the building system can comprise the states of each of the building devices that may be present in the building.

The building devices can affect the environment of the building. For example, a light fitting can be turned on or off (or dimmed) to illuminate a region of the building adjacent the light fitting. A heating or air conditioning unit can be turned on or off to heat or cool a region of the building adjacent the heating or air conditioning unit.

The building devices are not restricted to affecting the environment within the confines or area of the building, but can also affect the environment in a region of the building. The region of the building can include the area within the building, the threshold of the building, and/or an area near the building. The region of the building can, for example, comprise a walkway (or path or driveway) near or around a building, and/or a garden or grounds of the building. For example, a security light directed away from the building can illuminate an area that is outside the building.

The building devices, examples of which are given above, may be present within the building, or in a region of the building, optionally including its curtilage, all the time. The devices may be built into the building: for example, partially or wholly embedded in structures of the building such as walls, floors or ceilings. For example, a light fitting is suitably embedded in the building structure, such as in the ceiling. As another example, a heating system is suitably integrated within the building. Alternatively, a light fitting such as a desk lamp or free-standing floor lamp, or an appliance such as a desk fan, may be portable, and may therefore not necessarily be within the building, or in a region of the building, i.e. near to the building, all the time. Similarly, building devices can comprise general devices, for example computers such as PCs, which may be associated with the building. The techniques described herein are applicable to such devices too. Suitably the techniques herein apply to such devices when they are in the region of the building, including when they are within the building.

In general, the building devices are devices which have a state that can be controlled. In other words, the building devices have a state that can be altered, such as by turning the device on or off. Changing the state of the building device may be effected by circuitry within the building device itself such as a power circuit, or by circuitry in a power source (e.g. a power socket) from which the building device obtains power. This latter approach is particularly useful for plug-in appliances such as a desk fan or lamp. Changing the state of the building device alters the amount of energy that that building device consumes. Thus it is desirable to maintain the building devices in a relatively lower energy state when the building devices are not needed, for example when they are not being used. This can result in energy savings.

In addition to the building devices, there are suitably devices, such as electronic devices that are associated with use of the building. Such electronic devices associated with use of the building can include portable devices such as mobile telephones, personal digital assistants (PDAs), tablet computers, laptops and wearable devices such as watches and activity monitors, and non-portable devices such as printers, fixed line telephones and desktop computers. Activity of such electronic devices can be used to determine whether the building, or region of the building, is in use. This determination can be used to change the state of one or more of the building devices. In this way, the building devices can be moved to, or kept in, relatively lower energy states when it is appropriate to do so. For example, lights can be turned off when a region of a building is not in use, and/or other powered devices can be powered down or put into standby or sleep modes of operation. The building devices can be moved to, or kept in, relatively higher energy states when it is appropriate to do so. For example, lights can be turned on when a region of a building is in use, and/or other powered devices can be powered up or put into active modes of operation.

This changing of the state of the building devices (and therefore of the building system) permits a reduction or minimisation in the energy usage. This can be achieved as a result of lowering the energy usage of building devices when they are not needed. This can be done whilst maintaining the building devices in an appropriate state when they might be needed. Thus a person in the region under control is not inconvenienced by an inability to use building devices when desired.

The electronic devices associated with use of the building can indicate use of the building by various means. For example, a portable device such as a mobile telephone will usually be carried by a person. The portable device may be connectable to a building network or a local network, such as a wireless network, for example a Wi-Fi network. Where the mobile telephone is detected in a region of the building it can be used to indicate that a person is also in the region of the building, and that therefore the region of the building is in use. In another example, a fixed line telephone with a cordless handset may remain within a region of a building so the presence of the fixed line telephone is not sufficient on its own to determine use of the building. Instead, an activity level of the telephone can be assessed to determine use of the building. For example, if the phone is being used to make or receive a call it can indicate that a person is using the telephone and therefore that that region of the building is in use.

The presence and/or activity of the electronic devices associated with use of the building can be used in the control of the building devices. In other words, where an electronic device in a region of a building indicates that the region of the building is in use, lights can be turned (or kept) on, and power can be provided (or maintained) to heating or cooling systems. Where an electronic device in a region of a building indicates that the region of the building is not in use, lights can be turned (or kept) off, and power to heating or cooling systems can be reduced (or kept in a reduced state).

A building system controller can control the environment in the region of the building. The building system controller is suitably able to detect and/or analyse one or more electronic device and its activity level, and is suitably able to change the state of the building system in response to the detection and/or analysis.

FIG. 1 shows a schematic illustration of devices in a region of a building. A wireless network access point 10 is present in a region of a building. The access point is always present in the building. The access point 10 is able to communicate over a first wireless network using a first protocol. The access point 10 comprises a transceiver 15 to enable it to communicate using the first protocol. Whilst only a transceiver is illustrated in FIG. 1, the access point 10 may additionally or alternatively comprise a transmitter and a receiver via which it can communicate. A first device 20 is able to communicate over the first wireless network using the first protocol. The first device 20 communicates with the access point 10. The first device 20 comprises a transceiver 25 to enable it to communicate using the first protocol.

A second device 30 is able to communicate over the first wireless network using the first protocol. The second device 30 comprises a transceiver 35 to enable it to communicate using the first protocol. A third device 40 is able to communicate over the first wireless network using the first protocol. The third device 40 comprises a transceiver 45 to enable it to communicate using the first protocol.

Whilst the first device 20, the second device 30 and the third device 40 are illustrated in FIG. 1 as each comprising a transceiver 25, 35, 45, any one or more of the first device 20, the second device 30 and the third device 40 may additionally or alternatively comprise a transmitter and a receiver.

In one example the first protocol is Wi-Fi and the first network is a Wi-Fi network. The access point 10 is, in this example, a Wi-Fi router. As illustrated by the arrows in FIG. 1 between the access point 10 and each of the first device 20, the second device 30 and the third device 40, each device can communicate directly with the access point 10. It is also possible for the devices to communicate with one another without communicating with the access point 10. For example, as illustrated by the arrow between the first device 20 and the third device 40, the first device 20 can communicate directly with the third device 40.

The access point may also be capable of communicating over a second wireless network using a second protocol different to the first protocol. Any one or more of the first device 20, the second device 30 and the third device 40 may communicate with the access point 10 over the second network using the second protocol as well as or instead of over the first network using the first protocol. The devices may communicate with one another over the second network using the second protocol as well as or instead of over the first network using the first protocol.

The access point 10, the first device 20, the second device 30 and the third device 40 comprise a transceiver enabling communications over the network and protocol used by that device. In other words, where the access point 10, the first device 20, the second device 30 and/or the third device 40 communicate using the first protocol, the respective transceiver 15, 25, 35, 45 is operable to transmit and receive signals using the first protocol. Where the access point 10, the first device 20, the second device 30 and/or the third device 40 communicate using the second protocol, the respective transceiver 15, 25, 35, 45 is operable to transmit and receive signals using the second protocol. Where the access point 10, the first device 20, the second device 30 and/or the third device 40 communicate using both the first protocol and the second protocol, the respective transceiver 15, 25, 35, 45 comprises a first transceiver portion operable to transmit and receive signals using the first protocol and a second transceiver portion operable to transmit and receive signals using the second protocol. The electronic devices may be configured to communicate over additional protocols and/or additional networks.

In the example above, where the first protocol is Wi-Fi, the second protocol may be Bluetooth. Alternatively or additionally the first protocol and the second protocol may be the same protocol. In this example, both the first protocol and the second protocol are packet-based protocols. In one configuration, the access point 10 communicates with the first device 20, the second device 30 and the third device 40 over Wi-Fi, and the first device 20 and the second device 30 communicate with each other over Bluetooth. Any other convenient configuration is possible.

A controller 50, such as a building system controller, is able to observe communications over the first network and/or over the second network. In other words, the controller 50 is able to observe communications or signals sent using the first protocol and/or the second protocol. Where electronic devices are operable to communicate over additional networks and/or protocols, the controller 50 is suitably able to observe communications or signals sent over the additional networks and/or using the additional protocols.

The controller 50 comprises a transceiver 55. Instead of or in addition to the transceiver 55, the controller may comprise a receiver. The controller may additionally comprise a transmitter. The transceiver 55 is operable to receive signals sent over the first and/or second networks. The transceiver 55 is operable to receive signals sent using the first and/or second protocols.

Figure 2:
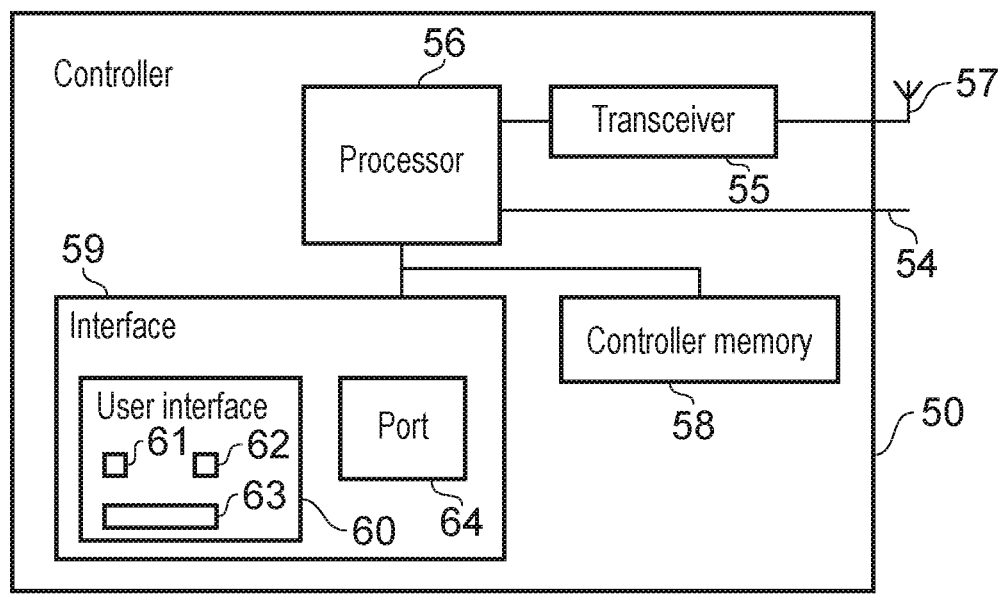
FIG. 2 schematically illustrates the controller in more detail.

An example of a controller 50 is schematically illustrated in FIG. 2. The controller 50 comprises a processor 56 coupled to the transceiver 55. Where the controller 50 comprises a receiver, and optionally also a transmitter, instead of or as well as the transceiver 55, the receiver, and optionally also the transmitter, is suitably coupled to the processor 56. The controller 50 comprises an aerial 57 which is coupled to the transceiver 55 for receiving and/or transmitting wireless signals. The controller 50 comprises a controller memory 58 coupled to the processor 56. The controller 50 comprises an interface 59 coupled to the processor 56. The interface 59 comprises a user interface 60. The user interface comprises two buttons or controls 61, 62 and a display 63. The user interface 60 permits user interaction with the controller 50. Any suitable number and combination of buttons and/or displays is possible. The display may comprise one or more indicator, such as an LED. The interface 59 comprises a port 64. The port 64 permits connection of the controller 50 to a computer peripheral, for example a computer or memory device such as a flash drive. The port may, for example, comprise a USB port, a firewire port, a serial port such as an RS-232 port, a network port such as an Ethernet port, or any other suitable port. Additionally or alternatively the transceiver 55 and/or another transceiver may provide a wireless connection between the controller and another computer device. The interface 59 may comprise the other transceiver. Suitably the interface 59 comprises a network-based interface such as a web-based interface, for example a web server. This permits communication over a network connection. The network connection may be a wired connection, via the port 64, and/or a wireless connection, via the transceiver 55 or the other transceiver. The web-based interface permits configuration of the controller both locally and remotely, for example via a web portal and/or mobile application.

The controller 50 is configured to listen to communications over the first and/or second protocols. The controller 50 can detect signals sent over these protocols, even if the controller 50 is not authorised to be part of the respective network. The controller 50 need not be part of a network to observe or acquire signals sent within, or propagating through, that network.

The controller is able to see all packets sent to any hardware address (on the frequency (or frequency range(s)) and/or channel that the controller 50 is configured to observe). Wireless packets such as Wi-Fi packets are sent through the air so are observable as long as the controller 50 is in range of those wireless packets and configured to observe on the correct radio frequency or frequencies.

A device driver such as a Wi-Fi device driver may ignore wireless packets that it receives that do not specify the address such as the hardware, or MAC, address of that device as a destination of the packet, i.e. the device driver may ignore packets that are not directed to its own address. There is a mode of operation of a device driver in which all packets are allowed to be passed forward from the device regardless of the address. This mode can be called 'promiscuous' mode, or 'monitor' mode (particularly in relation to a Wi-Fi device driver).

In one example, the controller 50 comprises a Wi-Fi module operable in monitor mode. Not all available Wi-Fi modules support monitor mode, as it is not typically used for activities outside of network debugging. Thus the controller 50 suitably comprises a Wi-Fi module that supports monitor mode. This permits the controller 50 to observe Wi-Fi packets from any device on the same Wi-Fi channel. More generally, this approach permits the controller 50 to observe signals such as Wi-Fi packets from any device that is transmitting in the frequency range that the controller is configured to observe.

Data contents of encrypted packets, or frames, if any, such as might be present on a secured Wi-Fi network are not visible without the network password or decryption key. On a secured Wi-Fi network, the packet headers typically contain unencrypted information including the name of the Wi-Fi network (which might comprise a service set identifier, or SSID, or a basic service set identifier, or BSSID), the hardware (media access control, or MAC) address of the device from which the packet was sent, for example a Wi-Fi client or a Wi-Fi access point, the hardware (MAC) address of the intended recipient of the packet, for example a Wi-Fi client or a Wi-Fi access point, the signal level of the received packet (according to the receiving module) and various other information related to the setup and capabilities of the wireless network. The received signal strength may be added to, or associated with, the packet, or frame, for example by being added to the header. In one example, the signal strength is added to a RadioTap header by the receiving or observing device. Unencrypted packets, or frames, typically comprise packet headers comprising similar information. In general, the controller 50 suitably comprises a hardware and/or a software radio that permits observation (i.e. receipt or reading) of wireless signals and reading of the unencrypted addresses and/or other network information. Data contents of the packets, or frames, i.e. encrypted data, need not be read or decrypted.

The controller 50 is configured to determine the presence and/or number of devices, such as active clients (i.e. client devices that are active on the network), on a particular network in dependence on this information. This can be achieved without needing to have the password or decryption key for that network. Thus the controller 50 can control devices associated with the building, such as one or more of lights and other powered devices or appliances, accordingly.

The controller need not obtain the address information in all examples. The controller 50 may be configured to determine the presence and/or number of devices, or to obtain an approximate indication of the presence and/or number of devices, in dependence on an amount of radio activity in an appropriate, for example a selected, frequency range. For a relatively longer-range protocol, such as compared to, for example Bluetooth, the network may contain a lot of noise from other networks, which may make it more difficult to determine differences between master and client devices. For a shorter-range protocol, such as Bluetooth, a determination based on the radio activity may be sufficient. In more general terms, where the controller 50 is arranged to determine the presence of devices and/or the number of devices in a region of a building, the controller can be configured to make this determination on the basis of radio activity in a predetermined frequency range. This may be appropriate where the distance range of the protocol being used is within, or at least substantially within, the region of the building of interest. In other words, if a region of interest extends around a controller for approximately 20 metres in each direction, then observing signals using a protocol with a distance range of 20 metres or less can provide sufficient information to be able to determine the presence of devices in that region. Thus, this technique can be used with protocols having longer-distance ranges where the regions of interest are correspondingly larger.

Suitably the controller 50 is configured to observe signals sent to the access point 10. Typically the controller 50 will be located at a given location in a building, and will not be constantly moved around the building. Signals transmitted from the access point 10 (which is also likely to be located in one place and not moved around the building) will therefore usually be observed by the controller 50 at a relatively constant received signal strength. In contrast, signals sent from other devices, which might move relative to the controller 50, are likely to be observed with varying received signal strengths. Thus preferentially observing signals transmitted to the access point 10 permits the controller 50 to obtain additional information regarding potential movement of the communicating devices. This can permit a greater level of filtering of the signals, or additional analysis of the signals.

Suitably the controller 50 is located adjacent, or in the proximity of, the access point. This can assist in ensuring that the controller 50 is within range of devices that are able to communicate with the access point.

The controller 50 is suitably configured to observe signals that have a valid transmitter address, i.e. the transmitter or source address is present in the signal, and not blank. The controller 50 is suitably configured, on observing the signal, to record the transmitter address, the received signal strength, the time the signal was received and/or the network over which the signal was transmitted (for example the hardware address of the access point to which the signal was transmitted or the BSSID/SSID). The controller 50 suitably stores this information in the controller memory 58.

Where the first device 20 transmits a wireless signal to the access point 10, the controller 50 can observe at least a part of this signal. That is to say, the first device 20 may transmit a burst (or a plurality) of packets and the controller 50 can observe at least one of those packets. The signal will typically comprise routing information, such as a destination and/or source address. Here the destination address will be that of the access point 10 and the source address will be that of the first device 20. The signal suitably comprises a header, and the header comprises the routing information. The signal will also typically comprise payload data, which may be encrypted. Decryption of the payload is not necessary in the present techniques.

The controller 50 is therefore able to observe the signal and to analyse the observed signal to determine information therefrom. The determined information comprises one or more of the destination address of the signal, the source address of the signal, the signal strength of the signal observed by the controller 50, the name of the network over which the signal is sent, or BSSID/SSID, and the hardware address of the access point to which the signal is sent.

By observing a packet-based signal over a period of time, the controller 50 is also able to determine the number of packets of that signal observed in a predetermined period of time, or the rate of observed packets, and how that rate varies with time.

As described above, the controller need not be authorised to join a network to be able to observe signals propagating through that network. As such, the destination address of the signals will not be that of the controller 50 (since the signals are being sent to another device, such as the access point 10 or the first device 20). Accordingly, the observance of the signals by the controller is incidental to the signals themselves. That is to say, the observance of the signal by the controller is incidental to the purpose of the signal as transmitted (which is to be received by the device specified in the destination address of the signal). The signals may be beacon signals. For example, the access point 10 (or another of the devices) may broadcast beacon signals to identify itself and provide information regarding the availability of the network. The controller 50 is suitably also able to incidentally observe such signals. The controller 50 observes the signals not necessarily for the purpose of joining the network or establishing communications with the access point 10, and so the observance of the signals can be said to be incidental in this case too.

In other words, the controller 50 is not on the logical communication path intended for the signals when transmitted. Nevertheless, the controller 50 is able to detect or observe the signals and to determine from the detected or observed signal, information pertaining to the signal.

Thus, in addition to the controller there may be a transmitter and a receiver. The transmitter and the receiver may be capable of establishing a logical channel between them for conveying data from the transmitter to the receiver. The controller may not be (or need not be) part of that logical channel but may be within range of the transmitter so that it can receive signals transmitted by the transmitter and intended for reception by the receiver. In this way the controller may incidentally observe the signals from the transmitter to the receiver.

The controller 50 is able to determine, from the information obtained from the signal, whether a control criterion is satisfied. The control criterion is suitably a predetermined control criterion. For example, the control criterion may be pre-set and/or adjustable by a user, and/or adjustable in dependence on information obtained from previous signals. The control criterion is such that satisfying the control criterion indicates a change in the use of the region of the building.

In a system where the controller 50 is configured to determine occupancy or use of a building, or region of a building, the controller 50 may obtain, from the signal, information which can indicate the occupancy or use. This information can be compared to a control criterion (or some combination of control criteria, enabling more selective determination of building use) to determine whether the region of the building is in use.

For example, a person may carry a mobile telephone into a region of a building. The mobile telephone can connect to a building Wi-Fi network. The controller can observe a signal sent between the Wi-Fi network access point and the mobile telephone. Where the control criterion is that a signal is observed, the controller 50 can determine that the region of the building is in use on the basis of the observed signal. The controller can accordingly control a building device as a result of determining that the building is in use, such as turning the building device on.

The controller 50 may be configured to observe on the building Wi-Fi network. The controller is suitably configured to determine a period of time for which no signal has been observed. Where the control criterion is that no signal is observed for a predetermined period of time, the controller can determine that the region of the building is not in use on the basis of not having observed a signal for the predetermined period of time. The controller can accordingly control a building device as a result of the determination, such as turning the building device off.

For example, where the access point emits beacon signals, the frequency of which varies according to the number of devices communicating with the access point 10, the controller 50 can use this information to determine if a control criterion is met. In this example, the access point 10 emits beacon signals at a frequency $f_1$ when no devices are communicating with the access point. As more devices connect to the access point 10, the access point 10 communicates with those other devices and therefore has less time to emit beacon signals (in this example). The frequency with which the access point 10 emits beacon signals therefore changes to $f_2$, where $f_2 < f_1$. A control criterion can be selected to be a threshold value of the frequency of beacon signals, $f_{th}$, which can be chosen as desired. In one example, $f_{th}$ is chosen to be just less than $f_1$ so that as soon as any device starts communicating with the access point 10, the frequency of beacon signal emission, $f_2$, drops below $f_{th}$, and the controller 50 is able to determine that the region of the building in which the access point 10 is located is being used. In another example $f_{th}$, is chosen to be a given proportion of $f_1$, such as two thirds, so that intermittent connection of devices with the access point 10 causes changes in the frequency of beacon signal emission that do not cause the frequency to drop below $f_{th}$, and so do not satisfy the control criterion. Sustained, or consistent, connection of a number of devices with the access point 10 causes changes in the frequency of beacon signal emission such that the frequency drops below $f_{th}$, satisfying the control criterion.

In the above example, the signals will not comprise a destination address. The signals will comprise at least one of a source address, a network name or other information identifying the network. The controller 50 is configured to use this information to discriminate between observed signals.

For example, the controller 50 may be within the range of two W-Fi access points, one of which, the access point 10, is within the region of the building of interest to the controller. The other of which, an external access point, is external to the region of interest. The controller 50 therefore suitably does not take into account signals from the external access point in determining the use of the region of interest. Where both access points transmit beacon signals, the controller can discriminate between the access points on the basis of an observed or determined source address or network name (assuming that the access points are on different networks). This enables the controller to determine when the frequency of transmission of beacon signals from the access point 10 changes, irrespective of the transmission of beacon signals from the external access point.

Further, the access point 10 may transmit signals to the devices with which it is communicating. In this instance, the controller 50 does not need to consider these signals (as it is here only considering beacon signals), so it may distinguish the signals of interest (the beacon signals) on the basis of an empty destination field. It may ignore signals which have a non-empty destination field.

In another example, the control criterion can be related to the destination address of a signal. For instance, where one or more device is communicating with the access point 10, signals from this device, or devices, will comprise the address of the access point 10 as the destination address. The source address, where present, may therefore differ depending on which device originated the observed signal. The control criterion may therefore include that the destination address of an observed signal matches a predetermined destination address. This will enable the controller 50 to distinguish any signals sent to the access point 10. This permits determination of the amount of traffic, or the number of signals, sent to the access point 10. This can be indicative of the number of active devices in the region of interest, and so of the use of that region.

There may be cases where there exist devices that are always present in the region of the building of interest. In these cases, it may be desirable to exclude signals sent from such devices when determining use of the building. For example, referring to FIG. 1, the second device 30 may be a printer. The printer can wirelessly communicate with the access point 10. In some instances the printer may periodically communicate with the access point 10 even when idle. In other instances the printer may be enabled to allow remote printing, in which case communications between the access point 10 and the printer do not necessarily indicate that the building is in use. Signals sent from the printer to the access point 10 will include the address of the access point 10 as the destination address of the signal. They will, at least in some cases, also include the source address of the printer. Thus these signals can be distinguished from those from other devices, such as the first device 20. The controller 50 is therefore able to filter out these signals by determining that the source address is either not on a list of devices of interest, and/or by determining that the source address is on a list of devices to ignore.

In the case of printers and other such peripherals which can be expected to be consistently present in the building irrespective of use of the building, it is possible to determine the source address of the printer, or a range of source addresses of multiple printers and/or other peripherals. This can be determined by scanning the source addresses. This can also be determined based on information obtained from a manufacturer. For example, where a given manufacturer manufactures printers and/or other peripherals, but does not manufacture any device of interest to the controller 50, a range of source addresses particular to that manufacturer can be determined. The source addresses can also be entered by a user, for example via the web-interface. Thus the list of source addresses is user-configurable. These source addresses that are determined to be for devices that are not of interest can be stored, and any signals with source addresses corresponding to the stored addresses can be ignored. Similarly, signals transmitted from the access point 10 to such stored addresses can also be ignored. This approach permits efficient selectivity of signals for further analysis.

Another way to identify devices whose activity or presence should be ignored in detecting building activity is to identify devices that are continually detected as being present over an extended period of time: for example for a period of a length greater than 8 hours, 12 hours, 24 hours or greater than 48 hours.

The above discussion relates to a list of source addresses to be ignored by the controller (a 'negative list of source addresses'). There may also be a list of source addresses that the controller does not ignore, for example those relating to devices of interest to the controller 50 (a 'positive list of source addresses'). Either or both of such lists may be referred to by the controller. Either or both of such lists are suitably stored. The lists can be stored locally to the controller. The lists can be stored remotely from the controller, and the controller can be configured to access the stored list over a communication path, such as a wired or wireless communication path.

Devices can be added to a 'positive' list by an action of a user, such as running an application on a mobile device, or moving the device closer to the controller whilst, say, pressing a button on the controller (so that, for example, the controller can determine the device based on received signal strength of signals from the device). The application might be configured to output a predetermined pattern (e.g. of signal power and/or timing) which is recognisable by the controller.

For instance, in a situation where the region of interest is near a busy corridor, there may be many devices being carried by people passing along the corridor. These devices may exchange signals with an access point in the region of interest. However, the detection of these devices does not mean that the region of interest is in use. In such cases, it is possible to provide a list of devices, the presence of which may indicate use of that region. As an example, a limited number of people may have access to a room adjacent a busy corridor. Source addresses of devices belonging to this limited number of people can be stored for reference by the controller 50. Thus, when signal traffic from other source addresses is detected, the controller 50 will ignore these signals. When signals comprising one or more of the stored source addresses are observed, the controller 50 can determine whether the region is in use on the basis of these signals.

It is also possible to use multiple controllers. In this case, the controllers can share information, including setup/configuration information, between devices. Suitably such sharing of information is done wirelessly between the controllers. The use of more than one controller permits a finer granularity in the positioning of building devices, such as by triangulation. Thus the controllers can be configured to determine whether a device is within a room or smaller area within a building region based on the finer granularity of positioning.

An address, such as a destination address or a source address, suitably comprises at least one of a hardware address, for example a media access control address (MAC address), and a software address, for example a network address.

As well as determining that the building is in use (for example when people arrive in a building) the controller 50 is additionally or alternatively able to determine when a building is not in use (for example when people leave a building).

The control criterion permitting the controller 50 to determine whether a building is not in use, or is no longer in use, may be the same as the control criterion permitting the controller 50 to determine whether the building is in use. For example, the control criterion may be a threshold value of a variable that indicates that a building is in use when the value of that variable is, for example, above that threshold value, and that indicates that the building is not in use when the value of that variable is, for example, equal to or below that threshold value. The threshold value is suitably configurable, such as user configurable (which might be via a local interface or over a network). In other examples, there may be a separation of values between a value indicating use and a value indicating that the building is not in use. For instance, the controller may be configured to determine that the building is in use where the value of a variable exceeds a threshold value, and to determine that the building is not in use where the value of the variable drops a predetermined amount below the threshold value. This 'hysteresis' in the behaviour of the controller can restrict or avoid quickly alternating between states when the value of the variable is close to the threshold value. The predetermined amount can be configurable, such as user configurable (again, this might be via a local interface or over a network). The predetermined amount can be selected as desired to reduce or avoid the quick alternation between states. Where the controller is to control lighting, for example, this can restrict or avoid undesirable flickering of the lights.

Suitably the controller 50 is configured to determine whether the control criterion is satisfied within a predetermined period of time. The predetermined period of time is suitably less than about 30 minutes. Preferably the predetermined period of time is less than about 20 minutes. More preferably the predetermined period of time is less than about 10 minutes, for example less than about 5 minutes. The controller 50 may be configured to observe wireless signals for a given time frame in every predetermined period, for example for 5 minutes every 30 minutes, or for 30 seconds every 10 minutes. This sampling of the wireless signal means that the controller 50 need not be turned on all the time. This can save energy. The sampling also helps to reduce quick alternation between states. It may also have the effect of smoothing out transient effects, or allowing such transient effects to settle, reducing the effect of such transient effects on the controller and therefore on the state of the building system.

A relatively shorter predetermined time period can reduce the delay in response time of the controller.

In one example of operation, the controller 50 is configured to determine that the building is in use on observing one packet of a signal (or observing a number of packets of a signal above any desired threshold number of packets, and/or observing a rate of packets of a signal above any desired threshold rate). Control of the building system can be effected in response to this determination. For example, lights can be turned on. The controller 50 may be configured to determine that the building is not in use if it does not observe any packets of a signal (or observing a number of packets of a signal less than any desired threshold number of packets, and/or observing a rate of packets of a signal less than any desired threshold rate) for a certain amount of time, such as the predetermined period of time. Control of the building system can be effected in response to this determination. For example, lights can be turned off.

Suitably the controller is configured to determine that the building is in use on observing a number of packets of a signal above a background level of packets (or a background activity of the wireless network or channel). Suitably the controller is configured to determine that the building is not in use on observing a number of packets of a signal at or below a background level of packets (or a background activity of the wireless network or channel). The background level may be predetermined, and/or user-adjustable. The background level may be zero. The background level may be automatically adjustable by the controller in dependence on an average level, for example a level averaged over a time when it is known or likely that the building is not occupied, such as at night-time for a typical office environment.

Conveniently the controller is configured to continually observe the wireless signal, or to observe the wireless signal at intervals, such as at predetermined intervals. For controlling systems such as lighting it is preferable for the controller to continually observe the wireless signal to ensure that the lights can be turned on without delay (or with a minimum of delay). For other powered systems, for example a coffee machine, there may be a greater degree of tolerance in the timing of when the powered system is turned on. For example, it may be acceptable to observe wireless signals every, say, 5 minutes in respect of controlling power to a coffee machine. Thus the controller may be configured to observe a wireless signal continually or at a predetermined interval in dependence on the powered system (or building device) which is being controlled. The predetermined interval is suitably configurable, for example user configurable.

In many situations where the building device is in a powered-on state it is not necessary for the controller 50 to be configured to continually observe the wireless signal. For example, where a light is turned on, it may not be desirable to turn the light off immediately when the last person leaves the region of the building. Instead, it may be preferable to turn the light off a certain period of time after the last person has left the region of the building. To achieve this, the controller may be configured to continually observe the wireless signal, and the control criterion may be satisfied if no determination that an electronic device of interest is present has been made for a predetermined period of time. Alternatively, the controller may be configured to observe the wireless signal periodically. The control criterion may be satisfied if no determination that an electronic device of interest is present has been made for a predetermined number of successive periods. In other words, the way in which the controller is configured to observe the wireless signal may differ depending on whether the building device is in a powered-off state (in which case it may be desirable to be able to turn it on quickly) or in a powered-on state (in which case it may be desirable to provide a delay, such as a timeout period, before turning it off).

Thus the behaviour of the controller 50 in observing the wireless signal may depend on the state of the building device and/or on the state of the building system.

The controller 50 may observe a wireless signal periodically where more than one channel or frequency is to be observed by the controller. In this example, the controller will switch between different channels or frequencies so as to be able to observe on each of them. Thus, the controller will not observe on any given channel all the time, but will observe on that channel periodically as the controller switches between channels. In one example, the controller is configured to observe on a given channel for a predetermined period of time, such as 0.5 or 0.2 seconds, before switching to the next channel. The controller is suitably configured to switch to observing the next channel on determining that a signal has been observed on the currently observed channel. Suitably, the controller is configured to switch to the next channel at the earlier of the expiry of the predetermined period of time, and when a signal has been observed on the current channel.

A plurality of transceivers can be provided. In this case, each transceiver can be configured to observe on one or more channel. Thus this permits more regular observation of the channels. This can reduce potential misses of occasional signals, and therefore improve the responsivity of the system.

In other examples, further to this mode of operation, additional information associated with the signal can be used to provide finer control. On observing a signal, or a packet of a signal, the controller 50 is suitably configured to determine information associated with that signal, or packet, and to store that information. The information is suitably stored in the controller memory 58. For example, the time of observation of the signal, the address (destination and/or source) of the signal and the received signal strength of the signal can be determined and stored. The behaviour or variation in any one or more of the detected variables over time can be used to provide filtering of which signals will satisfy a control criterion.

The controller is suitably configured to store the information in bins, for example time bins or signal strength bins. As a result, the controller is able to store information relating to signals that are observed in a particular time bin, say a 1 to 10 minute period. The controller is also able to group signals together according to the signal strength of those signals. The controller is therefore able to perform analysis on the binned data.

As an example, where an electronic device such as a mobile telephone is connected to a Wi-Fi network, and carried about by a person moving through the region of the building, the source and/or destination information of signals observed from that electronic device may not change in the course of a day. However, as the electronic device is moved through the region of the building, and thus moved relative to the controller 50, the received signal strength will vary over time. Thus the controller 50 may be arranged to determine that the region is occupied on the basis of this time-varying of this observed variable.

The time-varying of the signal strength, or the signal strength profile, from a particular device can be used to determine which devices are likely to be mobile and therefore associated with a person. Thus, if a signal strength profile varies throughout a given time period, such as 8 hours, 12 hours, 24 hours, 48 hours and so on, it can be determined that the device is a mobile device and is to be associated with a person. This determination can be made even if the device is continuously present in the region of the building throughout the relevant period.

In another example, a combination of the time-variance (or otherwise) of different variables can be used to determine presence in and/or use of a region of a building. An electronic device is present in the region, and does not move. The controller 50 is configured to observe signals continuously or periodically, for example once every ten minutes (for example in a power saving mode) or once every 0.5 seconds (for example in a continuous observation mode, which might include channel or frequency switching/hopping). The controller observes signals from the electronic device, and determines that the signals from the electronic device are regularly detected over a given time period, for example a time period in the range of approximately twelve to forty-eight hours. The observed signal strength of the signals does not appreciably vary during the given time period. The controller 50 may be configured to recognise the electronic device as one that does not provide an indication of occupancy or use of the building (as would be the case if this device was, say, a printer). Signals from this device could therefore be ignored or filtered out by the controller 50. The controller 50 is therefore able to modify its operation based on previously observed signals. Here, if the address of the electronic device is not on a list of known devices for the controller 50 to ignore, it might initially determine use of the building in dependence on signals from this device. After the given time period, or some other defined time period, the controller may determine that this device does not indicate occupancy or use, and may write the address of the device to the controller memory 58, and ignore signals from that device in future.

In this way, the controller 50 is able to modify its behaviour in dependence on observed signals.

On determining that a control criterion has been satisfied (whether it be to indicate a change from use to non-use, or from non-use to use), the controller 50 is suitably configured to change a state of the building system. The state of the building system can be changed in dependence on the determination that the control criterion is satisfied. The controller 50 is suitably configured to effect a change in a state of at least one building device.

The controller can effect the change in a state of the building device, or of the building system, by controlling that device or the building system to enter a different state from the state in which it is in at that time. In other words, to alter the state of that device. This includes turning powered systems, such as lighting and heating, off or on, or otherwise altering the power usage of devices, and so of the building system. The controller 50 is suitably configured to do this by directly controlling power to a system. For example, the controller may be embedded within a powered system, such as a lighting control circuit. On determining that the region of the building of interest has changed from being in use to being not in use, the controller can switch off power to at least a part of the lighting circuit. On determining that the region of the building of interest has changed from being not in use to being in use, the controller can switch on power to at least a part of the lighting circuit.

The controller 50 is additionally or alternatively spaced from the powered system, and operable to connect wirelessly and/or via a wired connection to the powered system or to a building system interface. This connection suitably permits the controller 50 to control the powered system, i.e. the building device. For example, the transceiver 55 of the controller 50 is operable to wirelessly transmit a control signal to effect control of the powered system. Additionally or alternatively the controller 50 may comprise a transmitter operable to transmit the control signal. The processor is suitably configured to generate the control signal. The controller 50 is suitably configured to send a control signal over a wired connection such as the signal line 54 to effect control of a powered system.

Figure 3:
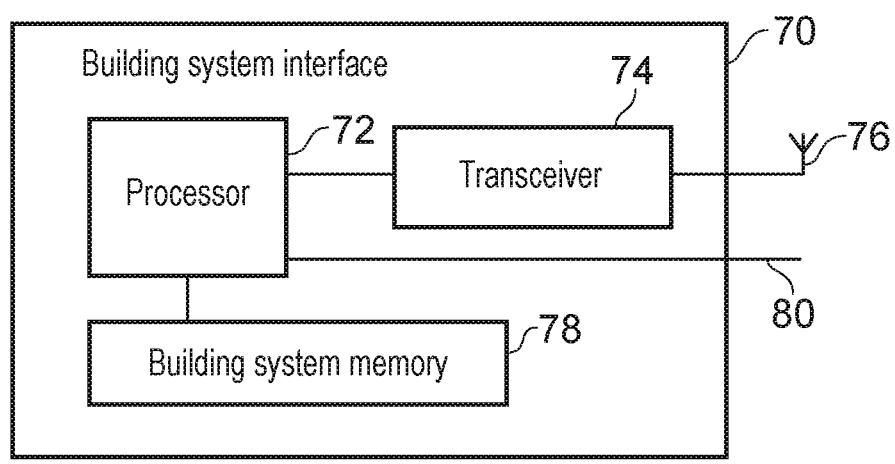
FIG. 3 schematically illustrates a building system interface.

An example of a building system interface is shown schematically in FIG. 3. The building system interface 70 comprises a processor 72, a transceiver 74 coupled to the processor 72 and to an aerial 76. The building system interface comprises a building system interface memory 78 coupled to the processor. The building system interface comprises a signal line 80 for receiving input signals and outputting output signals. In other examples, a plurality of signal lines can be provided. In these examples the input signals and output signals may be transmitted on different ones of the plurality of signal lines. In some examples, a transmitter and a receiver are provided in addition to or as an alternative to the transceiver 74.

In the example illustrated in FIG. 3, the building system interface 70 is operable to interface between the controller 50 and a building device. The building system interface 70 is configured to receive the control signal transmitted by the controller 50. The control signal can be received via the aerial 76 and the transceiver 74. The control signal can be received by the signal line 80. The building system interface is configured to determine an output signal in dependence on the received control signal. The output signal may comprise the received control signal. In some examples the output signal may be the received control signal. In some examples the building system interface 70 acts like a relay connecting the controller 50 to the building device. Suitably the building system interface 70 is configured to determine the output signal with reference to the building system interface memory 78. The building system interface memory 78 may comprise a look-up table. The look-up table suitably links the received control signal to the desired output signal to effect control of one or more building device in accordance with the control signal. Using a look-up table in this way can reduce the size and/or complexity of the control signal. This permits the control signal to propagate more quickly and/or permits a reduction in the bandwidth requirements for transmission of the control signal.

The output signal determined by the building system interface 70 may comprise more than one output signal portion. Where the control signal received from the controller 50 specifies that a plurality of building devices are to be controlled, the building system interface 70 suitably determines that the output signal comprises a plurality of output signal portions. The number of output signal portions may correspond to the number of building devices to be controlled. The building devices to be controlled may be grouped into one or more group. Suitably the number of output control portions corresponds to the number of groups of building devices. In an example, one group comprises lights that can illuminate a corridor, and another group comprises lights that light a particular room and a desk fan within that particular room. In this example, where an electronic device is present in the corridor, the controller is operable to send a control signal to turn the corridor lights on. Where an electronic device is present in the room, the controller is operable to send a control signal to turn on the room light and the desk fan. Another group may comprise computing equipment, such as a computer. In this example, where an electronic device is present in the room, the controller is operable to send a control signal to turn on the computing equipment. This control signal may be sent over a computing network to which the computing equipment is connected, such as a Local Area Network (LAN). Such network control can be used to put the computing equipment into sleep mode (where the room is determined to be not in use), or wake the computing equipment from sleep mode (where the room is determined to be in use).

Figure 4:
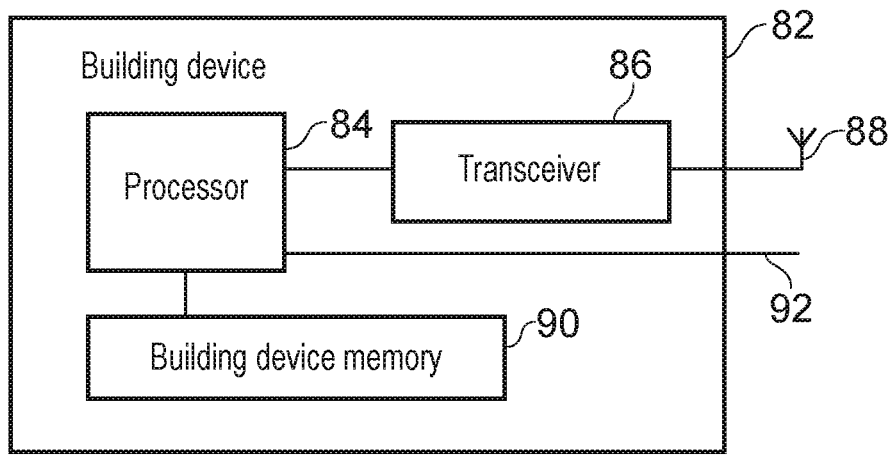
FIG. 4 schematically illustrates a building device.

A building device is schematically illustrated in FIG. 4. The building device 82 comprises a processor 84, a transceiver 86 coupled to the processor 84 and to an aerial 88. The building device 82 comprises a building device memory 90 coupled to the processor 84. The building device comprises a signal line 92 for receiving input signals. In some examples, a receiver is provided in addition to or as an alternative to the transceiver 86.

The building device 82 is operable to communicate with the building system interface 70. The building device 82 is configured to receive the output signal transmitted, or output, from the building system interface 70. In some examples, the building device 82 is operable to communicate with the controller 50 additionally or alternatively to being configured to communicate with the building system interface 70. In these examples, the building device 82 is configured to receive the control signal output from the controller 50. The building device 82 is configured to receive the output signal transmitted from the building system interface 70 and/or the control signal output from the controller 50 via the aerial 88 and the transceiver 86. Additionally or alternatively, the building device 82 is configured to receive the output signal transmitted from the building system interface 70 and/or the control signal output from the controller 50 via the signal line 92. The building device 82 is configured to change its state in response to the received signal.

For example, if the controller 50 transmits a control signal to turn the building device off, the building device will turn itself off in response to receiving the control signal from the controller 50 and/or in response to receiving an output signal transmitted from the building system interface 70 in response to receiving the control signal. Turning off the building device may leave at least a portion of control circuitry of that building device on, or powered, so as to permit receiving of a further signal to turn the building device back on. For example, where the building device is a light, the light can be turned off, and control circuitry can remain powered awaiting a further signal to turn the light back on. In an example, a leakage current can be passed through the building device when the building device is in an OFF state. The leakage current powers the control circuitry, but is not sufficient to power the building device itself.

Figure 5:
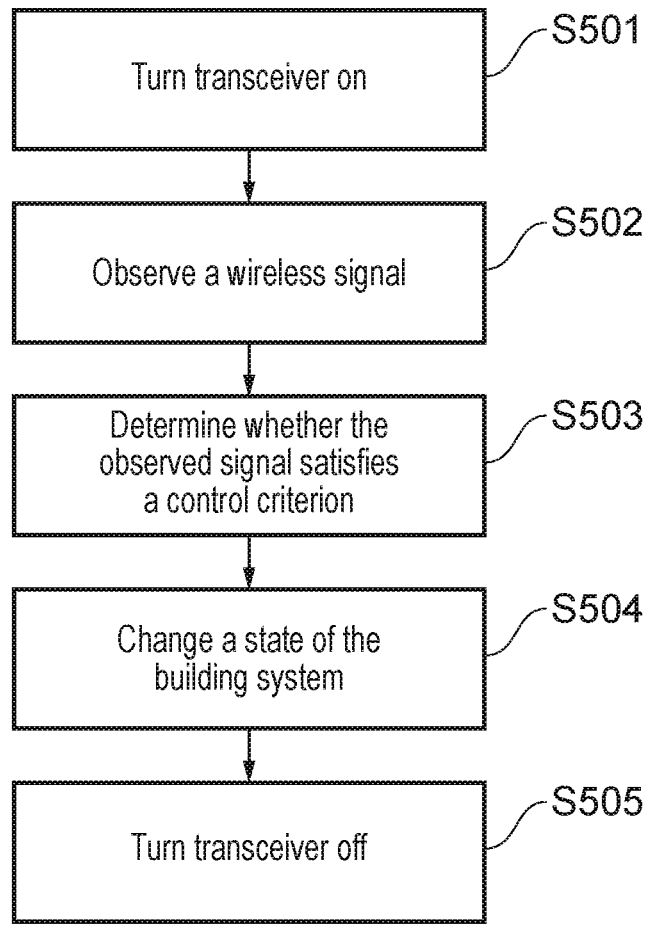
FIG. 5 illustrates a process of using the controller.

FIG. 5 illustrates an overview of the process. In step S501, the controller 50 turns the transceiver 55 on. In configurations where the transceiver is already on, such as because the transceiver is always kept on, this step can be omitted. In step S502, the controller 50 observes a wireless signal. On observation of a wireless signal, the process moves to step S503 in which the controller 50 determines whether the observed signal satisfies a control criterion. If the control criterion is not satisfied the process does not continue to step S504. In this case the process can terminate, or the process can skip to step S505 in which the controller 50 turns the transceiver off. In configurations where the transceiver is to be kept on, such as because it is always kept on, step S505 can be omitted. If the control criterion is satisfied, the process continues to step S504 in which the controller 50 transmits a control signal to change a state of the building system. The process can terminate here, or it can continue to step S505 if desired.

In some implementations, a setup procedure to set up the controller 50 can be run. The setup procedure can be run periodically. The controller 50 can be turned on. This can cause the controller 50 to initialise its hardware and device drivers for networks via which it is to observe signals and via which it is to effect control. In one example the controller 50 observes a Wi-Fi network, and effects control via a Z-Wave network. In other words, the controller 50 is configured to observe Wi-Fi signals, and the controller 50 is configured transmit a control signal via the Z-Wave protocol (i.e. to communicate with either or both of the building system interface 70 and the building device 82 via Z-Wave).

The controller can be configured to run the setup procedure automatically, and/or in response to input such as user input. An automatic setup might be followed by a user setup. Automatic setup can be performed on the basis of the strength of the received signals, the network name, and/or the hardware address of the received signals. Thus the controller can be automatically configured to observe on channels/frequencies selected in dependence on one or more of these criteria. This is discussed below.

Other examples of networks that the controller 50 can utilise to effect control include Zigbee, Thread, DALI, Lightify, RF, a wired interface, and control of networked/Wi-Fi devices.

Figure 6:
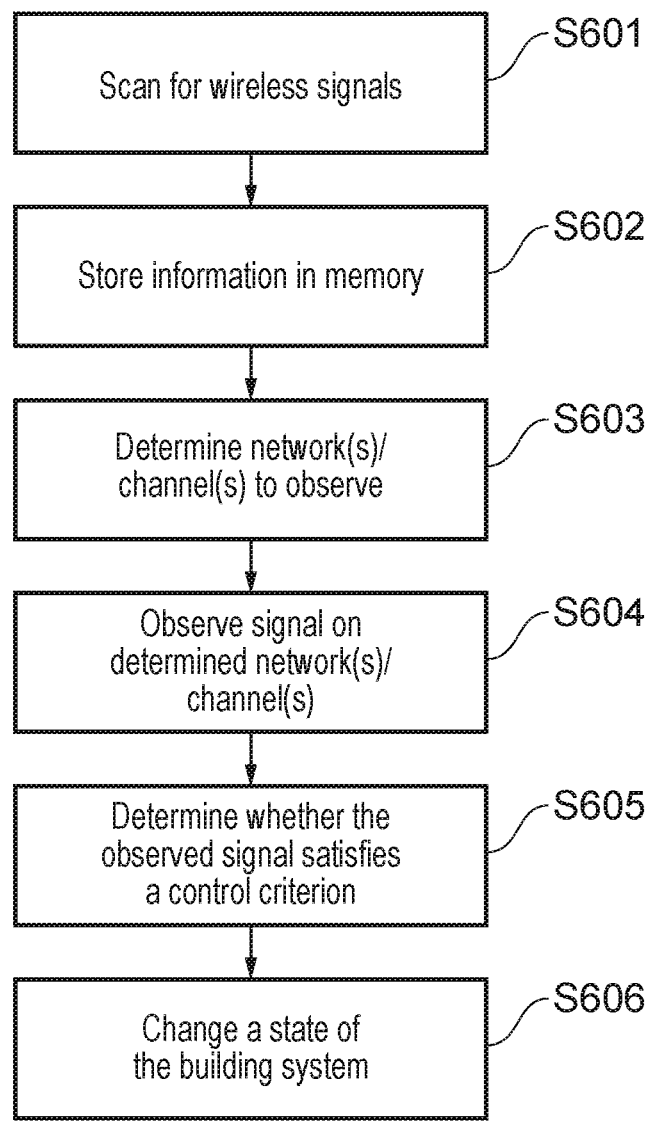
FIG. 6 illustrates another process of using the controller.

A process of identifying networks and/or channels to observe will now be described with reference to FIG. 6. The controller 50 identifies Wi-Fi networks to monitor by scanning all available channels for Wi-Fi beacon packets from access points (step S601). The controller records the received signal strength (where available) and network information in respect of observed beacon packets. The recorded information is suitably stored in the controller memory 58 (step S602). Additionally or alternatively, the recorded information is suitably stored in a remote memory location, for example at a remote server. The controller is configured to select a network to observe (step S603). Suitably this is done in dependence on the received signal strength of the beacon packets. In other words, the controller 50 will observe on the strongest network. Suitably the controller 50 is configured to observe on networks that it determines are associated with the strongest network. Such a determination can be made on the basis of the SSID of the network (for example a 2.4 GHz network and a 5 GHz network with the same SSID) or networks observed via the same access point (potentially with differing SSI Ds).

A 2.4 GHz network signal and a 5 GHz network signal sent from the same access point might have different received signal strengths. This can be due to propagation losses and/or differences in the receiving hardware. Typically the strengths of these signals are not very different. For example, the signals might differ in received strength by less than about 12 dB. For example, 2.4 GHz signals might differ by 6 dB or less, and 5 GHz signals might differ by 12 dB or less. Signals on 2.4 GHz networks with differing SSIDs can be determined to be observed via the same access point if the received signal strengths of the signals are within 6 dB, or preferably within 3 dB, of each other. Signals on 5 GHz networks with differing SSIDs can be determined to be observed via the same access point if the received signal strengths of the signals are within 12 dB, or preferably within 9 dB, of each other. The tolerance of this determination, i.e. the difference in relative strengths between networks, can be chosen in dependence on signal propagation or signal attenuation near the access points. For example, in an open space, there may be less difference in signal strengths between signals. Thus different networks may be determined to be observed via the same access point if the signal strengths are within, say, 6 dB of each other. In a space with many structural features such as walls or stairwells that cause relatively stronger signal attenuation, there may be a relatively greater difference in signal strengths between signals. Thus different networks may be determined to be observed via the same access point if the signal strengths are within, say, 9 dB of each other. This approach permits the determination to be made consistently despite fluctuations in the signal strengths. Networks with differing SSIDs can be determined to be observed via the same access point if they are observed on the same channel (though since 2.4 GHz networks and 5 GHz networks will be observed on different channels, this applies to 2.4 GHz networks and 5 GHz networks separately).

Signals may not necessarily comprise SSID/BSSID information. It is useful to determine the hardware addresses of the networks. Typically a hardware address will comprise 12 hexadecimal characters, which can be split into pairs (for example xx:xx:xx:xx:xx:xx). A portion of these characters may be associated with a manufacturer (and so might be used to determine whether the device belongs on one or other of the 'positive' or 'negative' lists discussed above). Addresses of networks on the same access point may differ by up to 4 characters. Therefore it is possible to determine that observed networks are on the same access point where the addresses are similar, i.e. where the addresses differ by fewer than four characters (or two pairs of characters), or preferably fewer than two characters (or one pair of characters).

In one example, a controller is configured to observe signals, and to determine a signal with a particular characteristic, such as the highest received signal strength. The controller is then able to determine the hardware address from which that signal was sent, and to observe other signals sent from that hardware address, or a similar hardware address (as determined above).

Any combination of the above approaches to determine whether observed networks are on the same access point is possible.

Thus the controller 50 is configured to select one or more network to observe in dependence on received signal strength, SSID and access point address information. Additionally or alternatively the network to observe can be selected manually. The user interface 60 can be used by a user to input details of the network to observe, or the user interface 60 or the port 64 can be used to transfer details of the network to observe to the controller 50. The controller 50 may be configured to periodically re-scan to enable automatic detection of changes in Wi-Fi setup.

In dependence on the selected network or networks to be observed, the controller 50 sets the transceiver to the appropriate channel or channels. If only one network is to be observed, or multiple networks on the same channel are to be observed, the transceiver observes only the appropriate channel (step S604). If multiple networks are to be observed, on different channels, the controller 50 causes the transceiver to switch between the relevant channels so as to be able to observe on each of the relevant channels. The controller 50 is able to function adequately, i.e. to determine occupancy or use of a building in dependence on observed signals, even if only a fraction of suitable packets are observed (as discussed in more detail below). A packet may be deemed suitable if it is sent from an electronic device to an access point identified as an access point of interest, i.e. one that should be monitored, and where the packet comprises the address of the transmitting electronic device. Thus this channel switching, which will reduce the time available for the transceiver to observe each particular channel, is acceptable. In some examples the controller 50 comprises multiple transceivers, for example multiple Wi-Fi chips, configured to observe on different channels. This arrangement will increase the time available for the controller 50 to observe any given channel, and so lead to a more complete observation of packets sent over that channel.

At step S605 the controller determines whether an observed signal on the one or more channel satisfies the control criterion. If it does, then at step S606 the controller 50 transmits a control signal to change a state of the building system.

Suitably, the controller 50 is able to function adequately when it is able to only observe a fraction of packets sent over a network. Whilst it may be preferable to capture every packet to ensure that the controller 50 is able to determine occupancy and/or use of the building with the greatest accuracy and/or with a minimum delay, this may not always be possible. In practice, the electronic devices will communicate over the network often enough that if some of the packets are missed, another packet can be observed at a later time, if the controller 50 observes the network or channel for a long enough period. In practice, an electronic device will usually transmit packets in a burst of a plurality of packets. More than one burst will usually be sent in a typical period in which the controller observes the network. Thus it is likely that at least one packet will be observed. This may be sufficient to permit the controller 50 to determine whether the observed signal satisfies the predetermined control criterion.

To take a specific example, three access points can be provided on different W-Fi channels on the same network. Observing on all three means that, due to the time taken to switch between the channels, each channel is being observed for less than one third of the time. Some events may be missed, but over a period of time, which can be from about a minute or so to about 10 minutes, all relevant electronic devices on the network can be detected, i.e. packets from the electronic devices can be observed. It is noted that in this situation the controller is observing packets from the electronic devices, rather than from the access point, for example. Thus, assuming that there are equal numbers of packets sent to each electronic device as there are sent from each electronic device, and that there will also be beacon packets transmitted by the access point, the observed packets on each channel considered by the controller represent less than one third (because there are three channels) of less than one half (because the controller is only considering signals sent from the electronic device) of total non-beacon packets. Even with this reduced amount, the approach described herein can be effective.

Time taken to process an observed packet may mean that the transceiver is not able to observe a subsequent packet for a short time after initially observing the packet. This can mean that some following packets are not observed. In a case where packets are sent in a burst, it will usually be sufficient to observe the first packet (or one packet) of the burst. It is not necessary to observe all packets sent in the burst. Thus the present approach is able to accommodate delays in software processing of packets.

The system has been described above in the context of controlling lighting and heating systems, amongst others. In some examples the state of the building system can comprise security settings, for example the state of one or more door lock. Where an electronic device is associated with a given person, for example the occupant of an office, determining the presence of that electronic device may cause the controller 50 to unlock the door of the office. Thus the occupant will be able to conveniently enter their office without needing to possess or use an entry card or key. When the occupant has left their office, the controller may determine that the electronic device is no longer present and, in response, cause the door to be locked automatically. In some situations the door may additionally be locked another way. Thus the automated door system can provide an additional layer of security.

It is possible for a single electronic device to be associated with a particular person. On the detection of the presence of that electronic device, the controller can effect control of the building system in accordance with a profile associated with that person. This can, for example, include any one or more of unlocking selected doors, turning selected lights on, setting the heating or cooling units to a selected temperature, powering up selected computing equipment (or waking the selected computing equipment from a sleep mode) and even turning on a coffee machine and also possibly selecting the appropriate drink to make. The profile is suitably configurable, such as software configurable. The profile may be configurable by a user.

In some examples more than one electronic device can be associated with a person. The controller may effect control of the building system in response to sensing the presence of any one, or of a predetermined combination, of those electronic devices.

The controller 50 may be configured to determine the class of an electronic device. For example, determination of a wearable electronic device can permit enhancement of the link between that device and a person which can increase the accuracy with which the system determines the presence of that person. Such increased accuracy may be particularly useful in the context of security applications. This may be because a higher level of confidence that a particular person is present is required. The electronic device can be determined to be a wearable electronic device in dependence on the address such as the hardware address of the device, by user definition and/or in dependence on the variation in the signal strength of the signals observed from that device. Hardware addresses of devices can be entered and/or stored as described above in the context of printers and other such peripherals. In one example, a non-wearable device may be brought into an office, left there in the morning, taken out at lunchtime, left in the office in the afternoon and taken out in the evening. A wearable device might be brought into the office, but then be taken out many times in the course of a morning and/or afternoon. Thus a wearable electronic device may generate a different signal strength profile over the course of a day (or any other suitable time period) compared to a non-wearable device.

The controller (or network of controllers) is suitably configured to use different networks for different purposes. For example, the controller might use one network for observations, another network for outputting control signals, and another network for configuration of the controller itself (or other controllers). The controller can be configured to communicate over a plurality of networks using one or more radio, such as a transceiver. The controller suitably comprises a different radio, such as a transceiver, for communicating over each network.

Whilst the system has been described herein in the context of an office building, the system is equally effective in other buildings or in other areas, including houses, gardens, sports centres, boats (e.g. ferries, cruise liners as well as smaller boats) and so on. The system is also effective in temporary structures such as marquees. The system can also be used at transport locations, such as train and/or bus stations or stops, and/or ports or marinas. The system can also be used at streetlight locations, to increase the lighting level for safety when an electronic device is observed in the proximity or region of the lamppost, for example.

The system also has applications in large venues, such as conference venues. In such venues, known sensing systems such as passive infra-red motion sensors may not provide adequate sensing capabilities due, in part, to the distance between such sensors and parts of the area to be sensed in many such venues. The present system can utilise an appropriate wireless network, such as one with a suitable range, to ensure that electronic devices in all regions of the venue can be observed. This can be done using fewer installed parts (such as controllers) than other systems.

The present system can be used independently of other presence detection technologies, such as motion sensors and ambient light sensors, or it can be integrated with other presence detection technologies. Such integration can provide the system with additional information and aid learning usage patterns.

The techniques above permit control of building devices, including powered systems, based on presence sensing, such as Wi-Fi presence sensing. This permits the energy consumption of the building devices and/or powered systems to be regulated and potentially reduced.

The controller 50 can store information associated with the control signals that it outputs. This information can be stored in the controller memory 58. This information can be stored separately from the controller 50, for example at a computer connected to the controller over a network. This information can comprise energy usage data associated with the building devices. The energy usage data can be obtained from a power meter coupled to the building device and/or estimated from knowledge of the building device power and times at which the building device is powered on and off. The building system interface 70 may be configured to determine energy usage data, for example by comprising power metering capability. This enables determination of an energy profile of separate building devices and/or the building system.

The controller 50 can store occupancy and/or network usage data, such as Wi-Fi usage data. This data can be stored in the controller memory 58 and/or stored separately from the controller 50, such as at a remote computer. Recording this data can allow reporting of peak hours, occupancy, usage levels and so on, on a per device, per user or on an average basis. This information can, for example, be used for behavioural analysis for improving workspace efficiency, analysis of employee working habits, clocking in and out of employees, monitoring department needs and/or use by an external monitoring or analysis entity.

The controller 50 and/or the building system can be connected to a server, for example via the internet. The connection can be made via the local or network interface on the controller. This can permit access to the controller memory 58 and/or the remote computer storing usage data via an external web portal or a mobile app, in addition to permitting user interactions and configuration via the user interface 60. This therefore permits remote, as well as local, configuration of the controller 50. The remote computer may comprise the server.

In systems employing the techniques described herein, manual control of the building devices can be maintained, for example via a switch. Manual control can be maintained as an override. The controller 50 is suitably able to monitor for manual operation of the switch. On detection of manual operation of the switch, the controller 50 is suitably configured to alter the control of the relevant building device. This can include enabling a permanent off mode (i.e. until the switch is again manually operated) or providing for a longer timeout period after manually turning a switch on.

The system suitably provides for an automatic fail-safe for specific conditions, such as a shutdown of the network, for example the Wi-Fi network. In this case the building devices suitably return to normal switch behaviour or other pre-configured behaviour.

Due to the use of wireless networks, such as the present system is effective with one controller, or a low number of controllers. This makes the installation, configuration and maintenance of the system much easier than for other systems. This also means that the system is particularly suited to environments such as older buildings where the system is able to be easily and cost-effectively retro-fitted into the building. This provides an effective way of providing energy management services at low cost even for older buildings.

As a result of leveraging the existing infrastructure, for example the wireless network infrastructure, within a building, such as the W-Fi networks, the present system is less costly to install and operate.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A building system controller for controlling an environment in a region of a building, the building system controller being configured to couple to a building system and operable to change a state of the building system, the building system controller comprising:
 a processor; and
 a receiver coupled to the processor, the receiver being operable to observe a wireless signal, over a network to which the receiver does not belong, from an electronic device in the region of the building, the observed wireless signal comprising header information;

the processor being configured to determine whether the observed wireless signal satisfies a predetermined control criterion in dependence on the header information wherein a determination that the predetermined control criterion is satisfied indicates occupancy or use of a region of the building; and the building system controller being configured to change a state of the building system in dependence on the determination that the control criterion is satisfied, thereby indicating occupancy or use of the region of the building.

2. The building system controller as claimed in claim 1, in which the building system controller is configured to determine a characteristic of the observed wireless signal, and the control criterion is a predetermined level of similarity between the observed characteristic of the wireless signal and a stored characteristic.

3. The building system controller as claimed in claim 2, in which the building system controller is configured to store the observed characteristic of the wireless signal.

4. The building system controller as claimed in claim 1, in which the observed wireless signal is a packet-based wireless signal.

5. The building system controller as claimed in claim 2, in which the characteristic of the observed wireless signal comprises at least one of:
 a destination address of the wireless signal;
 a source address of the wireless signal;
 a received signal strength;
 a network name of the network on which the wireless signal is observed;
 a time at which the wireless signal is observed;
 a number of observed packets; and
 a rate of observed packets.

6. The building system controller as claimed in claim 1, in which the building system controller is configured to observe the wireless signal periodically.

7. The building system controller as claimed in claim 1, in which the building system controller is configured to scan for wireless signals from electronic devices in the region of the building prior to observing the wireless signal over the network, and to store information associated with wireless signals detected in the scan.

8. The building system controller as claimed in claim 7, in which the information comprises at least one of: a wireless protocol of the wireless signal; a frequency or frequency band of the wireless signal; an activity level of the wireless signal; a signal strength of the wireless signal; a network name of a wireless network; an address of an access point of a wireless network; and an address of the electronic device.

9. The building system controller as claimed in claim 7, in which the building system controller is configured to determine a wireless signal channel to observe in dependence on the information.

10. The building system controller as claimed in claim 1, in which the building system controller is configured to receive information associated with observed wireless signals, and to store the information, in which the building system controller is configured to receive the information from one or more of a computing device connectable to the building system controller and a user interface.

11. The building system controller as claimed in claim 1, in which the processor is configured to output a control signal to the building system to cause the change in the state of the building system.

12. The building system controller as claimed in claim 1, in which the building system controller comprises a transmitter operable to transmit a wireless control signal, and the building system controller is configured to change the state of the building system by causing the transmitter to transmit the wireless control signal.

13. The building system controller as claimed in claim 1, in which the receiver is operable to observe the wireless signal from the electronic device in the region of the building without the receiver being communicatively coupled to the network.

14. The building system controller as claimed in claim 1, in which the receiver is operable to observe the wireless signal from the electronic device in the region of the building without the receiver needing to communicate over the network.

15. A method for controlling an environment in a region of a building, the building comprising a building system, the method comprising:
 observing, at a receiver, a wireless signal, over a network to which the receiver does not belong, from an electronic device in a region of the building, the observed wireless signal comprising header information;
 determining whether the observed wireless signal satisfies a predetermined control criterion in dependence on the header information, wherein a determination that the predetermined control criterion is satisfied indicates occupancy or use of a region of the building; and
 changing a state of the building system in dependence on the determination that the control criterion is satisfied, thereby indicating occupancy or use of the region of the building.

16. A method as claimed in claim 15, further comprising determining a characteristic of the observed wireless signal, the control criterion being a predetermined level of similarity between the observed wireless signal characteristic and a stored characteristic.

17. A method as claimed in claim 15, further comprising scanning for wireless signals from electronic devices in the region of the building prior to observing the wireless signal over the network, and storing information associated with wireless signals detected in the scan.

18. A method as claimed in claim 17, further comprising determining a signal channel to observe in dependence on the information.

19. A method as claimed in claim 15, further comprising outputting a control signal to the building system to cause the change in the state of the building system.

20. A non-transitory computer readable storage medium having stored thereon computer readable instructions that, when executed at a computer system, cause the computer system to:
 observe, at a receiver, a wireless signal, over a network to which the receiver does not belong, from an electronic device in a region of the building, the observed wireless signal comprising header information;
 determine whether the observed wireless signal satisfies a predetermined control criterion in dependence on the header information, wherein a determination that the predetermined control criterion is satisfied indicates occupancy or use of the region of the building; and change a state of a building system in dependence on the determination that the control criterion is satisfied, thereby indicating occupancy or use of the region of the building.

* * * * *